May 6, 1969  D. GRANT ET AL  3,442,921
PROCESS FOR THE PREPARATION OF TETRAORGANO GERMANES
Filed Oct. 21, 1964
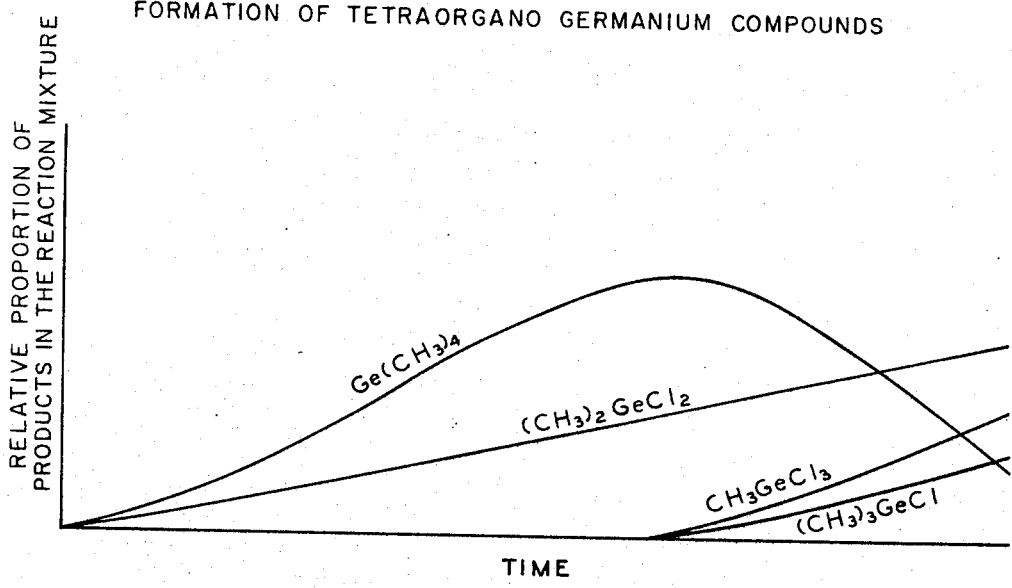
DRAWING REPRESENTATIVE OF THE FORMATION OF TETRAORGANO GERMANIUM COMPOUNDS
INVENTORS
DAVID GRANT
JOHN R. VAN WAZER
BY
ATTORNEY

United States Patent Office 3,442,921
Patented May 6, 1969

3,442,921
PROCESS FOR THE PREPARATION OF
TETRAORGANO GERMANES
David Grant, Ruabon, North Wales, and John R. Van Wazer, Ladue, Mo., assignors to Monsanto Company, St. Louis, Mo., a corporation of Delaware
Filed Oct. 21, 1964, Ser. No. 405,474
Int. Cl. C07f 7/00, 7/22; C08g 33/20
U.S. Cl. 260—429                                   6 Claims

ABSTRACT OF THE DISCLOSURE

The compounds of the present invention yield polymers such as by the hydrolysis of the alkyl germanium halides to yield polyalkyl germanium oxides. The aforesaid germanium alkyl and haloalkyl compounds are also useful as intermediates in the manufacture of other germanium compounds. The present invention relates to a process for the preparation of substituted germanium compounds, employing a germanium tetrahalide which is reacted with a substituted tin compound.

---

The present invention relates to a novel process for the production of alkyl, alkenyl, haloalkyl and haloalkenyl germanium compounds. According to the invention there are provided various germanium compounds having hydrocarbyl radicals including alkyl and alkenyl radicals of from 1 to 20 carbon atoms such as $Ge(CH_4)_4$ and aromatic radicals such as phenyl, tolyl and xylyl radicals as well as haloalkyl compounds such as $Ge(C_2H_5)_2Cl_2$ and other haloalkyl compounds. The hydrocarbyl groups having from 1 to 20 carbon atoms include both saturated and unsaturated compounds, the latter being typified by the allyl or vinyl radical, and also substituted alkyl radicals such as the benzyl radical.

Germanium alkyls such as germanium tetramethyl, also known as tetramethyl germane, have been made in the past by the use of a Grignard reagent or by the use of lithium alkyls; however the direct preparation as described herein overcomes certain disadvantages of such previously known methods.

The general process of the present invention is carried out by admixing the desired molecular proportions of a germanium tetrahalide such as germanium tetrachloride, germanium tetrafluoride, germanium tetrabromide, or germanium tetraiodide, with the corresponding proportion of tetraalkyl tin. The reaction mixture is then heated to a temperature in the range of from 30° C. to 400° C. a preferred range being from 50° C. to 300° C. A solvent is not necessary, although it is more convenient to operate in the presence of a hydrocarbon solvent, e.g., benzene, toluene or decane solvent or a halocarbon solvent such as carbon tetrachloride. The pressure which is employed is not critical, and the reaction may be conducted in a sealed tube or in an open reaction vessel.

The following examples illustrate specific embodiments of the present invention.

Example 1

The preparation of a germanium tetraalkyl compound, specifically germanium tetramethyl and the germanium methyl chlorides is shown in the present example. A pressure tube is charged with a 0.30 M solution of germanium tetrachloride in carbon tetrachloride and 0.30 M solution of tetramethyltin. In order to determine the effect of varying proportions a series of preparations were made. Equilibrium was determined at 300 hours and with the use of a temperature of 120° C. In general the preparation of the germanium alkyls and haloalkyls are carried out using molar proportions of from 3:1 to 100:1 of the tin tetraalkyl relative to the germanium tetrahalide. The table below shows the nature of the major products which are obtained in this specific example based upon germanium tetrachloride and tin tetramethyl in the respective proportions set forth below.

The separation of the germanium alkyl compounds is readily carried out by distillation methods. For example the germanium alkyl and haloalkyl compounds obtained by the reaction of germanium tetrachloride and tetramethyltin have the boiling points indicated, and are readily separated as individual components.

TABLE I $$\left(\frac{Sn(Me)_4}{GeCl_4}\right)$$

| Proportion | Major Product | Physical Properties |
|---|---|---|
| 4:1 | $Ge(Me)_4$ | B.P., 44.3° C (740 mm.). $d_{20}$, 0.9661. $n_D^{20}$, 1.3882. |
| 3:1 | $GeMe_3Cl$ | B.P., 115° C. (760 mm.). M.P., −13° C. $d_{20}$, 1.2493. $n_D^{20}$, 1.4337. |
| 2:2 | $GeMe_2Cl_2$ | B.P., 124° C. (760 mm.). M.P., −22° C. $d_{20}$, 1.5053. $n_D^{20}$, 1.4600. |
| 1:3 | $GeMeCl_3$ | B.P., 111° C. (760 mm.) $d_{20}$, 1.7053. $n_D^{20}$, 1.4685. |

It is found that at 300 hours the equilibrium proportions are about 20 mole percent of germanium tetramethyl and about 15 mole percent of germanium dimethyl dichloride, with the proportion of the germanium tetramethyl increasing with time.

It is also an embodiment of the invention to determine the maximum production of the completely alkylated germanium compound, in this instance germanium tetramethyl by the detection of the appearance of the methyl germanium trichloride and trimethyl germanium chloride in the reaction mixture of alkylated germanium compounds. These two compounds appear at the approximate time when the concentration of the germanium tetramethyl has reached a maximum, as shown in the drawing of the present patent application. This determination of the first appearance of such methyl germanium trichloride and trimethyl germanium chloride is conducted by the use of a gas chromatography test or by nuclear magnetic resonance.

In general the identification of the molecular characterization of the germanium compounds of the present invention are conducted by nuclear magnetic resonance, including the determination of shifts due to the higher alkyl groups appearing as peaks and multiplets. The observed peak area then provides an indication of the relative proportions of the various groups.

In the present example, the optimum yield of germanium tetramethyl corresponds to the first indication by gas chromatography or nuclear magnetic resonance of the methyl germanium trichloride and trimethyl germanium chloride.

Example 2

The preparation of tetra(n-propyl) germane and the n-propyl germanium halides is shown in the following example. The procedure of Example 1 using tetrapropyl tin and germanium tetrachloride with the ratios set forth below, as well as the resultant products and their characterization are summarized in Table II below:

TABLE II $\left(\dfrac{Sn(Pr)_4}{GeCl_4}\right)$

| Proportion | Major Product | Physical Properties |
| --- | --- | --- |
| 4:1 | Ge(Pr)$_4$ | B.P., 225° C. (760 mm.) |
| 3:1 | GePr$_3$Cl | B.P., 227° C. M.P., −70° C. $d_{20}$, 1.100. $n_D^{20}$ 1.4641. |
| 2:2 | GePr$_2$Cl$_2$ | B.P., 209.5° C. M.P., −45° C. $d_{20}$, 1.275. $n_D^{20}$, 1.4725. |
| 1:3 | GePrCl$_3$ | B.P., 167° C. $d_{20}$, 1.513. $n_D^{20}$, 1.4779. |

Example 3

The preparation of tetra(isopropyl) germane and isopropyl germanium halides is shown in the present example. The process used is the same as in Example 1 at the 4:1 proportion of the isopropyl tin and germanium chloride; the nature of the products and their characterization are shown in the table below; the tetra-isopropyl germane being obtained as the major product in best yield when the presence of tri-isopropyl germanium chloride, and iso-propyl germanium trichloride are first detected.

TABLE III

Physical properties

Major product—(i - prop)$_4$
Ge _____ B.P. 164.5° C., $n_D^{20}$ 1.4760.
Minor products:
   (i-prop)$_3$GeCl _____ B.P. 222° C., $n_D^{20}$ 1.472, $d_{20}$ 1.11.
   (i-prop)$_2$GeCl$_2$ _____ B.P. 203° C., M.P. −52° C., $n_D^{20}$ 1.9738, $d_{20}$ 1.268.
   (i-prop)GeCl$_3$ _____ B.P. 164.5° C., $n_D^{20}$ 1.4760.

Example 4

The preparation of mixed methyl germanium bromides is shown in the present example. The procedure is the same as in Example 1, using the proportions of 4:1 tetramethyl tin and germanium tetrabromide. The nature of the products and their characterization are shown in the table below, with the tetramethyl germane (shown in Example 1) being obtained as the major product in best yield when the presence of trimethyl germanium bromide and methyl germanium tribromide are first detected.

TABLE IV

Major products:     Physical properties
   Ge(Me$_3$)Br _____ B.P. 115° C., $d_{20}$ 1.5486, $n_D^{20}$ 1.466.
   GeMe$_2$Br$_2$ _____ B.P. 153° C., $d_{20}$ 2.1163, $n_D^{20}$ 1.5268.
   GeMeBr$_3$ _____ B.P. 168° C., $d_{20}$ 2.6337, $n_D^{20}$ 1.5770.

Example 5

The present example shows the preparation of tetraphenyl germane and mixed phenyl germanium chlorides, using the procedure of Example 1 but with a proportion of 4:1 for tetraphenyl tin and germanium tetrachloride. The nature of the resultant products and their characterization are shown in Table V, with the tetra-phenyl germane being obtained as the major product in best yield when the presence of triphenyl germanium chloride and phenyl germanium trichloride are first detected.

TABLE V

Physical properties
Major product—Ph$_4$Ge _____ MP. 235° C.

Minor products:
   Ph$_3$GeCl _____ M.P. 115° C.
   PhGeCl$_3$ _____ B.P. 115°/19 mm.

The alkyl germanium compounds and the haloalkyl germanium compounds of the present invention are useful in a number of relationships including the polymerization of olefins with the alkyl germanium as a catalytic constituent used with a metal halide of group IV-A, V-B or VI-B and an organic peroxide, or molecular oxygen. Furthermore the above compounds are readily decomposed in a hot tube or other heat source for the deposition of elemental germanium in the manufacture of semiconductors. Alternatively the evolved germanium from a hot tube decomposer may be reacted with other elements to form germanium compound semiconductors such as germanium selenide.

The germanium compounds also yield polymers such as by the hydrolysis of the alkyl germanium halides to yield polyalkyl germanium oxides. The aforesaid germanium alkyl and haloalkyl compounds are also useful intermediates in the manufacture of other germanium compounds.

What is claimed is:

1. Process for optimizing the maximum production of tetra-n-propyl germane, which comprises mixing and heating together germanium tetrachloride with a 4:1 molecular proportion of tetra-n-propyl tin, relative to the said germanium compound, continuing the said heating until at least one compound selected from the group consisting of tri-n-propyl chlorogermane and n-propyl trichlorogermane can be detected, and at this point separating the tetra-n-propyl germane from the reaction mixture.

2. Process for optimizing the maximum production of tetra-isopropyl germane which comprises mixing and heating together germanium tetrachloride with a 4:1 molecular proportion of tetra-isopropyl tin, relative to the said germanium compound, continuing the said heating until at least one compound selected from the group consisting of tri-isopropyl chlorogermane and isopropyl trichlorogermane can be detected, and at this point separating the tetra-isopropyl germane from the reaction mixture.

3. Process for optimizing the maximum production of tetramethyl germane which comprises mixing and heating together germanium tetrachloride with a 4:1 molecular proportion of tetramethyl tin, relative to the said germanium compound, continuing the said heating until at least one compound selected from the group consisting of trimethyl chlorogermane and methyl trichlorogermane can be detected, and at thist point separating the tetramethyl germane from the reaction mixture.

4. Process for optimizing the maximum production of tetraphenyl germane which comprises mixing and heating together germanium tetrabromide with a 4:1 molecular proportion of tetraphenyl tin, relative to the said germanium compound, continuing the said heating until at lesat one compound selected from the group consisting of triphenylchlorogermane and phenyltrichlorogermane can be detected, and at this point separating the tetraphenyl germane from the reaction mixture.

5. The method for optimizing the maximum production of a compound having the formula GeR$_4$, where R is selected from the group consisting of alkyl and alkenyl radicals having 1 to 20 carbon atoms, phenyl, tolyl, xylyl and benzyl radicals, which comprises mixing and heating together GeX$_4$, where X is selected from the group consisting of fluorine, chlorine, bromine and iodine, with at least a 4:1 molar proportion of SnR$_4$, relative to the germanium compound, and continuing the said heating until at least one compound selected from the group consisting of $GeR_3X$ and $GeRX_3$ can be detected, and at this point separating the product from the reaction mixture.

6. Process for optimizing the maximum production of tetramethyl germane, which comprises mixing and heating together germanium tetrabromide with a 4:1 molecular proportion of tetramethyl tin, relative to the said germanium compound, continuing the said heating until at least one compound selected from the group consisting of trimethyl bromogermane and methyl tribromogermane can be detected, and at this point separating the tetramethyl germane from the reaction mixture.

References Cited

UNITED STATES PATENTS 3,100,217  8/1963  Bartocha _____ 260—448

OTHER REFERENCES

Gilman: Organic Chemistry (vol. I), John Wiley and Sons, New York, N.Y. (1943), pp. 493–4 and p. 523.

THOMAS E. LEVOW, *Primary Examiner.*

A.P. DEMERS, *Assistant Examiner.*